United States Patent
Ferguson et al.

(10) Patent No.: US 11,187,462 B2
(45) Date of Patent: Nov. 30, 2021

(54) METALLURGICAL FURNACE HAVING AN INTEGRATED OFF-GAS HOOD

(71) Applicant: Systems Spray-Cooled, Inc., Smyrna, TN (US)

(72) Inventors: Scott A. Ferguson, Murfreesboro, TN (US); Troy D. Ward, Franklin, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 223 days.

(21) Appl. No.: 16/419,670

(22) Filed: May 22, 2019

(65) Prior Publication Data

US 2020/0025448 A1    Jan. 23, 2020

Related U.S. Application Data

(60) Provisional application No. 62/699,537, filed on Jul. 17, 2018.

(51) Int. Cl.
*F27D 17/00* (2006.01)
*C21C 5/38* (2006.01)

(52) U.S. Cl.
CPC .............. *F27D 17/002* (2013.01); *C21C 5/38* (2013.01)

(58) Field of Classification Search
CPC ....... C21C 5/38; C21C 7/0075; F27D 17/002; F27D 17/001
USPC ....... 266/158, 241, 44, 46; 432/233; 373/73, 373/74, 75, 76, 113, 165
See application file for complete search history.

(56) References Cited

U.S. PATENT DOCUMENTS

| | | | |
|---|---|---|---|
| 3,415,179 A | * | 12/1968 | Scheel .................... G03B 9/58 454/64 |
| 4,063,028 A | | 12/1977 | Longenecker |
| 4,715,042 A | | 12/1987 | Heggart et al. |
| 4,815,096 A | | 3/1989 | Burwell |
| 4,849,987 A | | 7/1989 | Miner, Jr. et al. |
| 5,115,184 A | | 5/1992 | Arthur et al. |
| 5,290,016 A | | 3/1994 | Elsner |

(Continued)

FOREIGN PATENT DOCUMENTS

| | | |
|---|---|---|
| EP | 2693145 A1 | 2/2014 |
| JP | H08035779 A | 2/1996 |
| JP | 3162619 B2 | 5/2001 |

OTHER PUBLICATIONS

International Search Report and Written Opinion for PCT/US2019/033532 dated Aug. 29, 2019.

*Primary Examiner* — Scott R Kastler
*Assistant Examiner* — Michael Aboagye
(74) *Attorney, Agent, or Firm* — Patterson + Sheridan, LLP

(57) ABSTRACT

An apparatus is disclosed for a metallurgical furnace having a roof with an integrated off-gas hood. The roof has a hollow metal roof section. The hollow metal roof section has a top and a bottom surface. The hollow metal roof section has a center opening configured for one or more electrodes to pass therethrough. An enclosed space is disposed between the top and the bottom surface. A spray-cooled system is disposed in the enclosed space and configured to spray-coolant on the bottom surface of the roof. The integrated off-gas hood has an inlet open to the center opening. The spray-cooled system is also configured to cool the integrated off-gas hood.

16 Claims, 4 Drawing Sheets

(56) References Cited

U.S. PATENT DOCUMENTS

| | | | | |
|---|---|---|---|---|
| 5,601,427 A | * | 2/1997 | Yuasa | F23G 5/085 |
| | | | | 432/161 |
| 5,648,981 A | * | 7/1997 | Miner, Jr. | F27D 1/1816 |
| | | | | 373/71 |
| 5,943,360 A | | 8/1999 | Haissig | |
| 5,999,558 A | * | 12/1999 | Miner, Jr. | F27D 1/1816 |
| | | | | 373/74 |
| 2008/0128962 A1 | | 6/2008 | Arthur et al. | |

* cited by examiner

US 11,187,462 B2

METALLURGICAL FURNACE HAVING AN INTEGRATED OFF-GAS HOOD

RELATED APPLICATIONS

This application claims the benefit of U.S. Provisional Application No. 62/699,537, filed Jul. 17, 2018, the contents of which is incorporated herein in its entirety.

BACKGROUND OF THE DISCLOSURE

Field of the Disclosure

Embodiments of the present disclosure relates generally to a ladle metallurgical furnace, particularly a ladle metallurgical furnace having an integrated off-gas hood.

Description of the Related Art

Ladle metallurgical furnaces (LMF's) are used in the processing of molten metal materials. LMF's are an intermediate steel processing unit that further refines the chemistry and temperature of molten steel while it is still in the ladle. The ladle metallurgy step comes after the steel is melted and refined in the electric arc or basic oxygen furnace, but before the steel is sent to the continuous caster. The carrying out of metallurgical reactions in the ladle is a common practice in most steelmaking shops as it is cost-efficient to operate the primary furnace as a high-speed melter and to adjust the final chemical composition and temperature of the steel after tapping in the LMF.

The simplest form of steel treatment in the ladle takes place when the mixing effect of the tapping stream is used to add deoxidizers, slag formers, and small amounts of alloying agents. These materials are either placed into the ladle before tapping or are injected into the tapping stream. Control over steel temperature can be achieved in a LMF with electrodes for arc heating with the ladle acting as the furnace shell. Argon gas and/or electromagnetic stirring is applied for better heat transfer. Most LMFs can raise the temperature of the steel by 4° C. per minute to 6° C. per minute by inducing a strong exothermic chemical reaction (for instance, by feeding aluminum and injecting oxygen) at the stirring station.

Injecting calcium-silicon or magnesium-lime into the steel is used to remove sulfur and dissolved oxygen. Exposing steel to vacuum conditions has a profound effect on all metallurgical reactions involving gases. First, it lowers the level of gases dissolved in liquid steel. Hydrogen or nitrogen, for example, is readily removed in a vacuum. In theory, oxygen and carbon, when dissolved in steel, react to form carbon monoxide. Argon is also blown in during this end phase for better mixing and removal of hydrogen and nitrogen. However, with the introduction of all these agents, the LMF off-gases large quantities of gases and fumes that needs to be captured and removed.

Emissions are typically evacuated through a vacuum pumping system and collected prior to the pumps or they are discharged under water contained within a weir wall-equipped hotwell. The process gases, including those entrained in the intercondenser discharge water, are exhausted from the hotwell via a motor driven fan to a vent stack equipped with a flare burner. However, the complexity and efficiency of the vacuum pumping system with the LMF is both costly and cumbersome.

Therefore, there is a need for an improved off-gas evacuation system for the metallurgical furnaces.

SUMMARY

An apparatus is disclosed for a metallurgical furnace having a roof with an integrated off-gas hood. The roof has a hollow metal roof section. The hollow metal roof section has a top and a bottom surface. The hollow metal roof section has a center opening configured for one or more electrodes to pass therethrough. An enclosed space is disposed between the top and the bottom surface. A spray-cooled system is disposed in the enclosed space and configured to spray-coolant on the bottom surface of the roof. The integrated off-gas hood has an inlet open to the center opening. The spray-cooled system is also configured to cool the integrated off-gas hood.

BRIEF DESCRIPTION OF THE DRAWINGS

So that the way the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present invention is directed to an electric arc metallurgical furnace, or other furnace such as a ladle metallurgical furnace (LMF), configured with a spray-cooled roof having an integrated off-gas hood. The LMF has a plurality of electrodes which enter the furnace through an opening in the roof and heat or melt the material in the LMF. The spray-cooled roof is subject to temperatures suitable for melting metal materials. The off-gas hood integrated into the spray-cooled roof is configured to remove gases and fumes escaping the LMF. The integrated off-gas hood draws from the opening disposed in the spray-cooled roof. The opening is utilized by the electrodes to access molten material in an interior volume of the LMF. The spray-cooled roof has a top which may be flat to provide safe access to the roof section. A coolant supply header provided in the roof section for cooling the roof is additionally configured to cool the integrated off-gas hood. The spray-cool system additionally operates to cool the gases and fumes evacuated from the furnace through the integrated off-gas hood.

Figure 1:
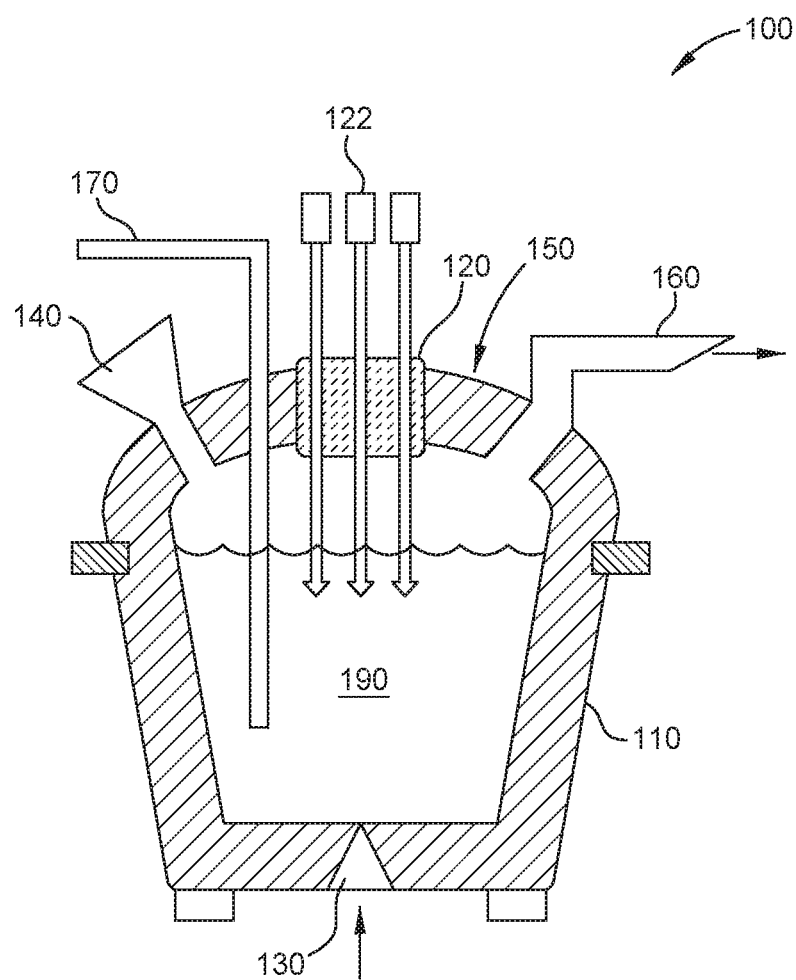
FIG. 1 illustrates a side view of a ladle metallurgical furnace having a conventional roof disposed thereon.

FIG. 1 illustrates a side view of a ladle metallurgical furnace (LMF) 100 having a conventional roof 150 disposed thereon. The LMF 100 is suitable for melting scrap and other metals therein and may have temperatures exceeding 1000° Celsius, such as temperatures of about 1250° Celsius. The LMF 100 may utilize a spray-cool system, or other cooling system, to protect itself from these elevated temperatures so as to avoid damage such as structural melting, compromise of seals or valves and/or exceeding the yield strength for structural components. The LMF 100 may be disposed on rails or other transport mechanism to move the LMF 100 from one location to another. For example, the LMF 100 may be moved along the rails to provide the molten material therein to a secondary operation location, such as a casting operation.

The LMF 100 has a body 110. The body 110 is configured to support the conventional roof 150 moveably disposed thereon. An interior volume 190 of the LMF 100 is enclosed by a conventional roof 150 and the body 110. The interior volume 190 may be loaded or charged with material, e.g., metal, scrap metal, or other meltable material, which is to be melted within the LMF 100.

A port 130 extends through the body 110 into the interior volume 190. The port 130 is configured to inject a fluid, such as argon gas, into the molten material disposed in the interior volume 190 of the LMF 100.

The conventional roof 150 may be circular in shape when viewed from a top plan view. The conventional roof may have one or more of a hopper 140, a powder injection lance 170 and a central opening 120. The hopper 140 is configured to supply additives to the material in the interior volume 190. The powder injection lance 170 is similarly configured to supply additives to the material in the interior volume 150.

The central opening 120 may be formed through the spray-cooled roof 150. Electrodes 122 extend through the central opening 120 from a position above the conventional roof 150 into the interior volume 190. During operation of the LMF 100, the electrodes 122 are lowered through the central opening 120 into the interior volume 190 of the LMF 100 to provide electric arc-generated heat to melt the material.

The conventional roof 150 may further include an exhaust port 160 to permit removal of fumes generated within the interior volume 190 of the LMF 100 during operation. Conventionally, the exhaust port 160 extends into the interior volume 190 for venting gases and fumes therein.

Figure 2:
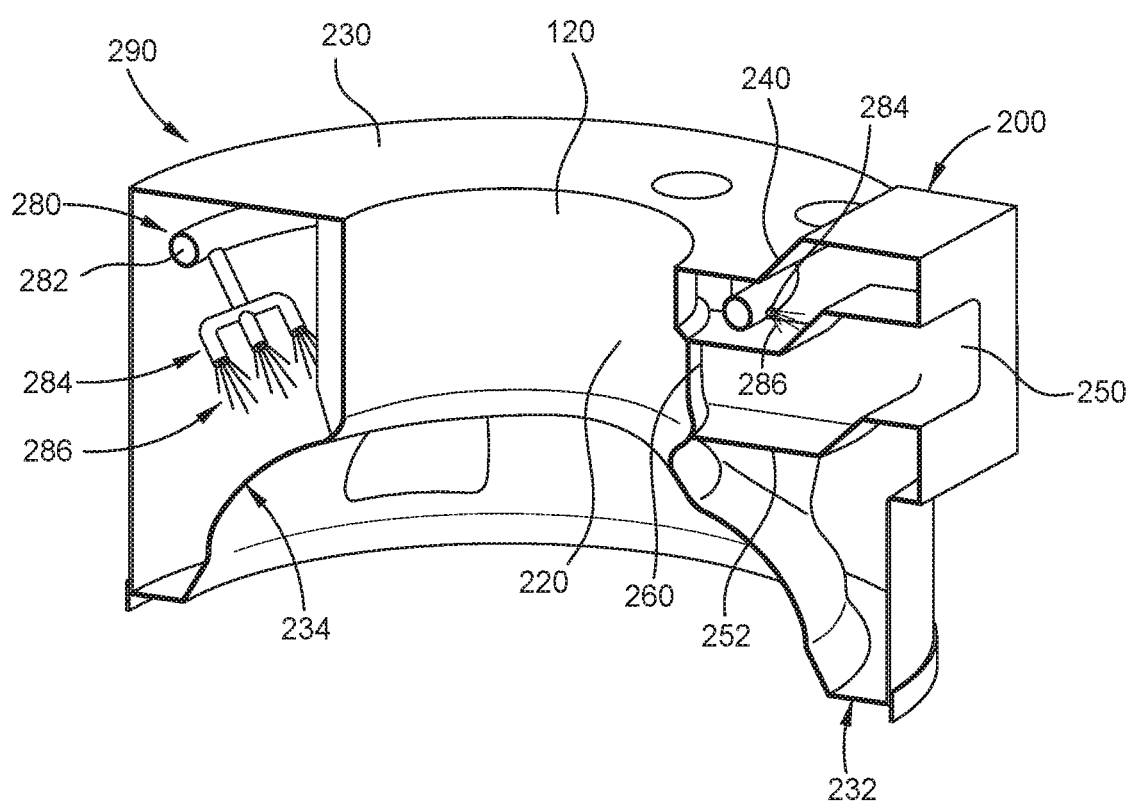
FIG. 2 illustrates a cross section for a spray-cooled roof having an integrated off-gas hood suitable for the ladle metallurgical furnace of FIG. 1.

FIG. 2 illustrates a cross section for a spray-cooled roof 290 having an integrated off-gas hood 200 suitable for use on the ladle metallurgical furnace 100 of FIG. 1. The spray-cooled roof 290 has a top surface 230 and a bottom surface 234. The flat top surface 230 may be flat to support one or more persons thereon. Thus, maintenance can be made easier and safer on the flat top surface 230 of the spray-cooled roof 290.

The spray-cooled roof 290 has an opening 120 configured to allow electrodes to extend therethrough and heat the material in the LMF 100. The opening 120 has a sidewall 220 extending from the top surface 230 to the bottom surface 234. The sidewall 220, top surface 230 and a bottom surface 234 surrounds an enclosed space 240 of the spray-cooled roof 290.

The spray-cooled roof 290 has a spray-cooling system 280 inside the enclosed space 240. The spray-cooled system 280 has a header 282 and a plurality of spray nozzles 284. The header 282 provides a coolant 286 to the spray nozzles 284 for spraying the coolant on the interior surfaces of the spray-cooled roof 290, such as the sidewall 220 and bottom surface 234.

The integrated hood 200 has an outlet 250 and an inlet 260 disposed on the sidewall 220 of the opening 120. A channel 252 fluidly couples the inlet 260 to the outlet 250. The channel 252 may have a step or jog therein such that the inlet 260 is vertically further from a plane of the top surface 230 than the outlet 250. In this manner, the top surface 230 may be made flat at or near the opening 120. The inlet 260 is configured to capture, or draw, gases and fumes rising through the opening 120 and pull the gases and fumes into the channel 252 of the integrated hood 200. The inlet 260 prevents the gases and fumes from escaping through the opening 120 in the spray-cooled roof 290. The gases and fumes entering into the channel 252 of the integrated hood 200 are plumbed through the outlet 250 to a recovery system. The inlet 260 location on the sidewall 220 provides better extraction efficiency as the gases and fumes which are naturally directed to the opening 120 where the integrated hood 200 is configured to draw the gases from. This in turn prevents off-gas leaks and ambient air penetration which would otherwise occur through the opening 120.

One or more of the nozzles 284 may be inside the integrated hood 200 or aligned to spray coolant 286 on the channel 252. The spray-cooled system 280 is thus configured to cool the integrated hood 200 and in particular the channel 252. Cooling the channel 252 has the additional benefit of further cooling the gases recovered by the integrated hood 200 prior to exiting the outlet 250.

Figure 3:
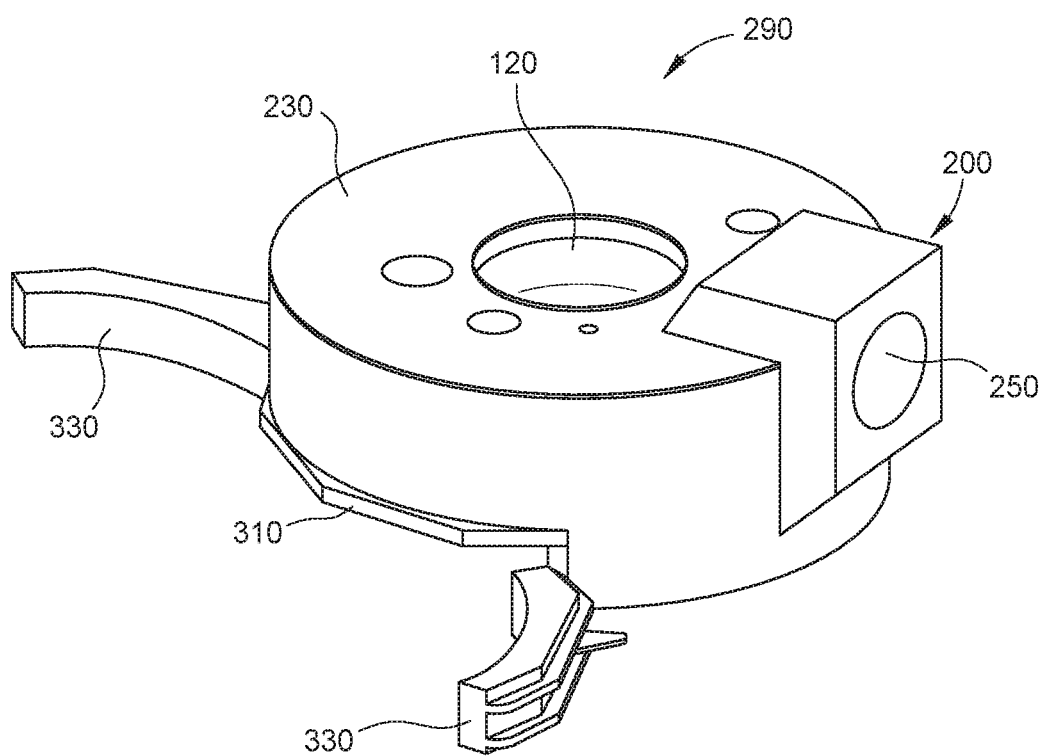
FIG. 3 illustrates a top perspective view for the spray-cooled roof of FIG. 2.
Figure 4:
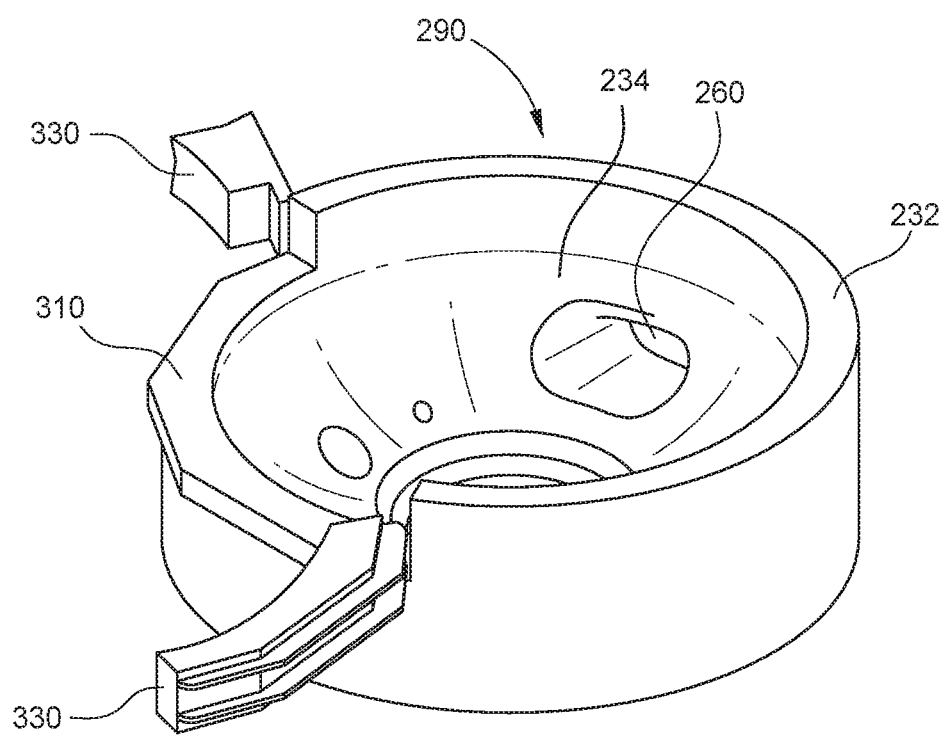
FIG. 4 illustrates a bottom perspective view for the spray-cooled roof of FIG. 2.

FIGS. 3 and 4 will be discussed together here. FIG. 3 illustrates a top perspective view for the spray-cooled roof 290 of FIG. 2. FIG. 4 illustrates a bottom perspective view for the spray-cooled roof 290 of FIG. 2. The spray-cooled roof 290 has doors 330. The doors 330 are operable between an open position and a closed position. In the closed position, the doors 330 provide a seal between the body 110 of the LMF 100 and the spray-cooled roof 290. In the open position, the doors 330 expose an opening 310. The opening 310 provides access to the interior volume 190 of the LMF 100. Additionally, when the doors 330 are in the open position, the LMF 100 may be moved from the spray-cooled roof 290 without lifting/raising the spray-cooled roof 290.

Advantageously, the LMF roof with the integral off-gas hood has more efficient cooling, eliminates off-gas leaks and ambient air infiltration, reduces fabrication costs of the roof of the off-gas collection system, and provides a safer level surface to work on. In the embodiments disclosed above, the LMF roof with the integral off-gas hood is additionally configured with doors allowing the ladle to move in/out without raising the roof.

While the foregoing is directed to embodiments of the present disclosure, other and further embodiments may be devised without departing from the basic scope thereof, and the scope thereof is determined by the claims that follow.

What is claimed is:

1. A spray-cooled roof for a ladle metallurgical furnace, the spray-cooled roof comprising:
   a hollow metal roof section, the hollow metal roof section comprising:
      a top surface and a bottom surface;
      an opening configured for one or more electrodes to pass therethrough;
      an enclosed space disposed between the top and the bottom surface; and
      a spray-cooled system disposed in the enclosed space and configured to spray-coolant on the bottom surface of the roof;
   an integrated off-gas hood has an inlet disposed on a sidewall of the opening in the hollow metal roof section; and
   a channel disposed through the hollow metal roof section, the channel fluidly coupling the inlet to an outlet of the integrated off-gas hood.

2. The spray-cooled roof of claim 1 wherein the spray-cooled system is also configured to cool the integrated off-gas hood.

3. The spray-cooled roof of claim 1 wherein the opening further comprises:
 a sidewall, wherein the inlet is disposed on the sidewall of the opening.

4. The spray-cooled roof of claim 3 wherein the outlet fluidly of the off-gas hood is coupled to the channel opposite the inlet.

5. The spray-cooled roof of claim 4 wherein the channel has a step therein such that the inlet is vertically further from a plane of the top surface than the outlet.

6. The spray-cooled roof of claim 5 wherein the top surface is flat at or near the opening.

7. The spray-cooled roof of claim 1 further comprising:
 one or more doors operable between an open position and a closed position wherein the door in the open position exposes an opening to an interior volume.

8. The spray-cooled roof of claim 7 wherein when the doors are in the open position, the ladle metallurgical furnace is moveable in or out from underneath the spray-cooled roof without lifting or raising the spray-cooled roof. without lifting or raising the spray-cooled roof.

9. A ladle metallurgical furnace comprising:
 a body, the body having an interior volume;
 a spray cooled roof disposed on and supported by the body, the spray cooled enclosing the interior volume, the spray cooled roof comprising:
  a hollow metal roof section, the hollow metal roof section comprising:
   a top and a bottom surface;
   an opening configured for one or more electrodes to pass therethrough;
   an enclosed space disposed between the top and the bottom surface; and
  a spray-cooled system disposed in the enclosed space and configured to spray-coolant on the bottom surface of the roof;
  an integrated off-gas hood has an inlet open to disposed on a sidewall of the opening in the hollow metal roof section; and
  a channel disposed through the hollow metal roof section, the channel fluidly coupling the inlet to an outlet of the integrated off-gas hood.

10. The ladle metallurgical furnace of claim 9 wherein the spray-cooled system is also configured to cool the integrated off-gas hood.

11. The ladle metallurgical furnace of claim 9 wherein the opening further comprises:
 a sidewall, wherein the inlet is disposed on the sidewall of the opening.

12. The ladle metallurgical furnace of claim 11 wherein the outlet fluidly of the off-gas hood is coupled to the channel opposite the inlet.

13. The ladle metallurgical furnace of claim 12 wherein the channel has a step therein such that the inlet is vertically further from a plane of the top surface than the outlet.

14. The ladle metallurgical furnace of claim 13 wherein the top surface is flat at or near the opening.

15. The ladle metallurgical furnace of claim 9 further comprising:
 one or more doors operable between an open position and a closed position wherein the door in the closed position provides a seal between the body and the spray-cooled roof and the door in the open position expose an opening to the interior volume.

16. The ladle metallurgical furnace of claim 15 wherein when the doors are in the open position, the body is moveable in or out from underneath the spray-cooled roof without lifting or raising the spray-cooled roof.

* * * * *